US012799898B2

(12) United States Patent
Poumarede et al.

(10) Patent No.: US 12,799,898 B2
(45) Date of Patent: Nov. 17, 2026

(54) METHOD AND SYSTEM FOR STARTING AN AERONAUTICAL TURBINE ENGINE HAVING A FREE TURBINE AND A SINGLE-SPOOL GAS GENERATOR

(71) Applicant: SAFRAN HELICOPTER ENGINES, Bordes (FR)

(72) Inventors: Vincent Poumarede, Moissy-Cramayel (FR); Sylvain Pierre Votie, Moissy-Cramayel (FR); Lucie Stéphanie Apostin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 19/156,252

(22) PCT Filed: Feb. 14, 2024

(86) PCT No.: PCT/FR2024/050196
§ 371 (c)(1),
(2) Date: Aug. 13, 2025

(87) PCT Pub. No.: WO2024/170855
PCT Pub. Date: Aug. 22, 2024

(65) Prior Publication Data

US 2026/0126014 A1 May 7, 2026

(30) Foreign Application Priority Data

Feb. 14, 2023 (FR) ....................................... 2301371

(51) Int. Cl.
*F02C 7/268* (2006.01)
*F02N 11/00* (2006.01)

(52) U.S. Cl.
CPC ............ *F02C 7/268* (2013.01); *F02N 11/006* (2013.01); *F05D 2220/323* (2013.01); *F05D 2260/85* (2013.01)

(58) Field of Classification Search
CPC .......... F02C 7/26; F02C 7/268; F02N 11/006; F01D 19/00; F01D 15/10; F05D 2220/323; F05D 2260/85
See application file for complete search history.

(56) References Cited

U.S. PATENT DOCUMENTS 4,724,331 A * 2/1988 Nordlund ................ F02C 7/268
290/27
5,844,383 A * 12/1998 Denaci .................... F02C 7/264
318/473

(Continued)

FOREIGN PATENT DOCUMENTS

| | | |
|---|---|---|
| EP | 0234055 B1 | 9/1987 |
| EP | 0623741 B1 | 11/1994 |
| EP | 3092389 B1 | 11/2016 |

OTHER PUBLICATIONS

Search Report and Written Opinion issued in International Application No. PCT/FR2024/050196, mailed Jun. 7, 2024, No English translation was provided.

*Primary Examiner* — William H Rodriguez
(74) *Attorney, Agent, or Firm* — Bookoff McAndrews, PLLC

(57) ABSTRACT

Method for starting an aeronautical free turbine and single-spool gas generator turbomachine, in which to ensure, under the control of a turbomachine regulation computer, the startup of the turbomachine solely from a battery delivering a nominal direct voltage of 28V, two electric machines attached to the same accessory gearbox mechanically linked to the gas generator of the turbomachine and mounted in parallel on the battery are actuated sequentially, the first (Continued)

electric machine being started under a starting torque allowing an increase in the speed of the gas generator with a determined minimum acceleration, and the second electric machine being started only after detection of the ignition of the combustion chamber of the gas generator.

10 Claims, 4 Drawing Sheets

(56) References Cited

U.S. PATENT DOCUMENTS

| | | | | |
|---|---|---|---|---|
| 6,018,199 | A * | 1/2000 | Shiroyama | B60W 10/30 903/903 |
| 2006/0180703 | A1 * | 8/2006 | Zielinski | F28D 7/0066 244/57 |
| 2010/0194203 | A1 | 8/2010 | Patterson | |
| 2013/0160731 | A1 * | 6/2013 | Poeltenstein | B60K 6/48 123/179.1 |
| 2014/0026689 | A1 * | 1/2014 | Nakamura | F02N 11/006 74/6 |
| 2020/0083823 | A1 * | 3/2020 | Latulipe | H02P 6/005 |
| 2023/0323846 | A1 * | 10/2023 | Ishii | F02N 11/0814 |

* cited by examiner

[Fig. 1]
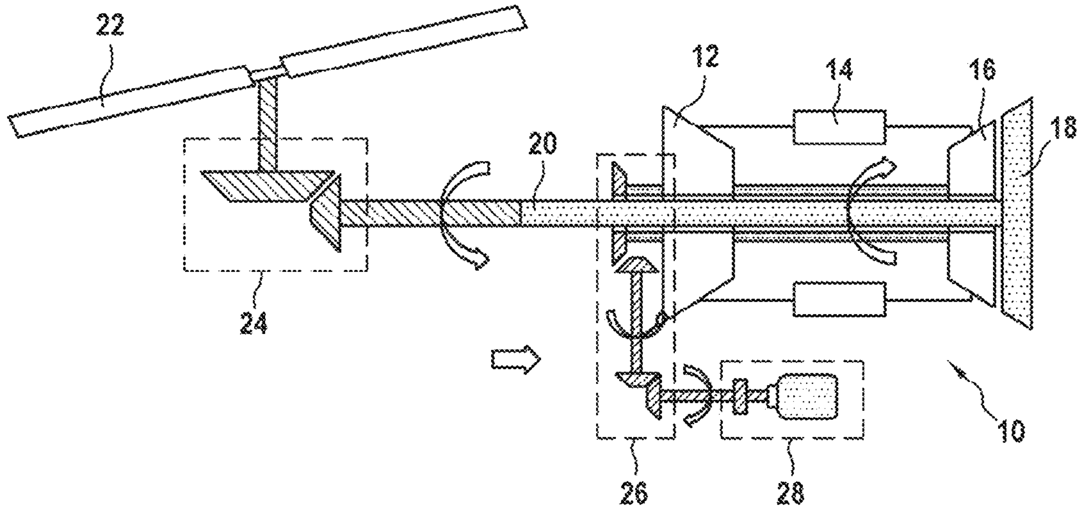
[Fig. 2]
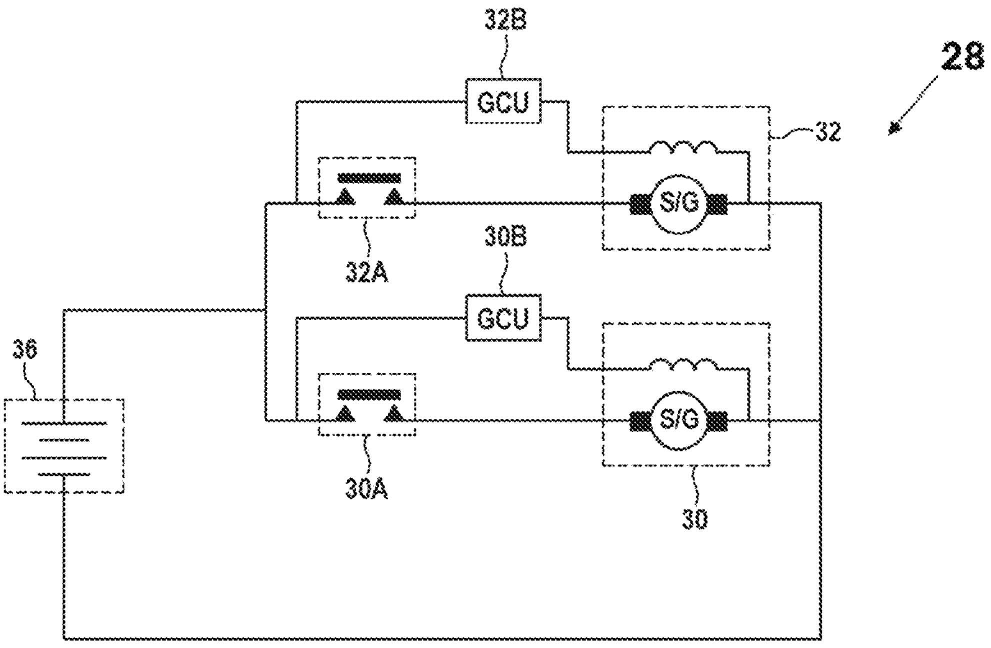

[Fig. 3]
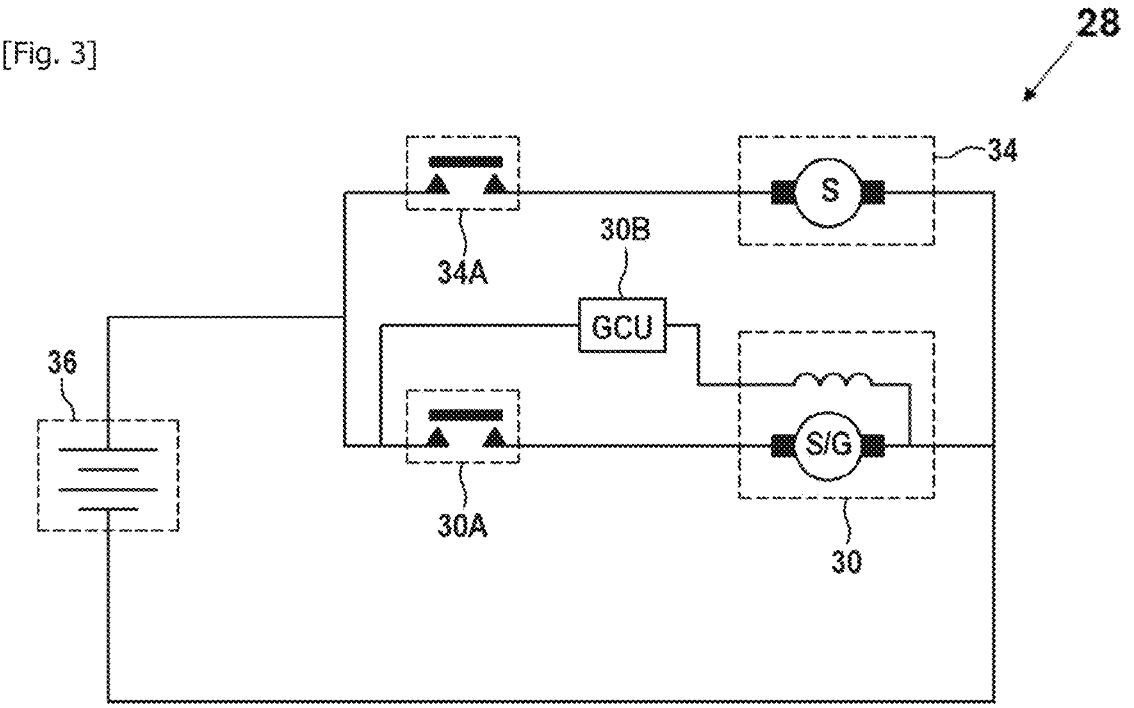
[Fig. 4]
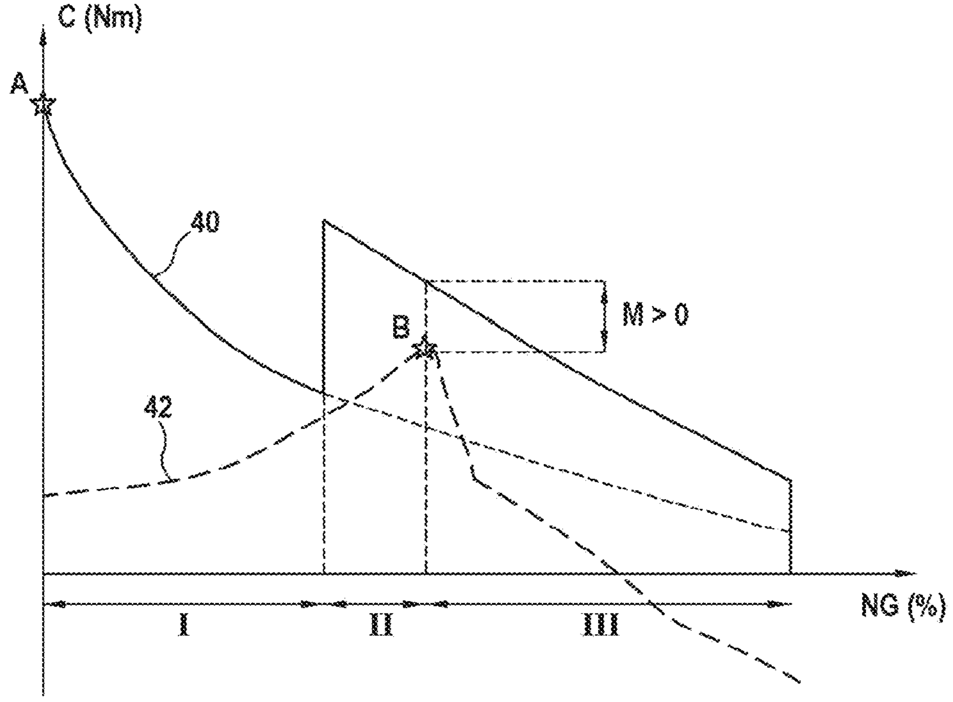

[Fig. 5]
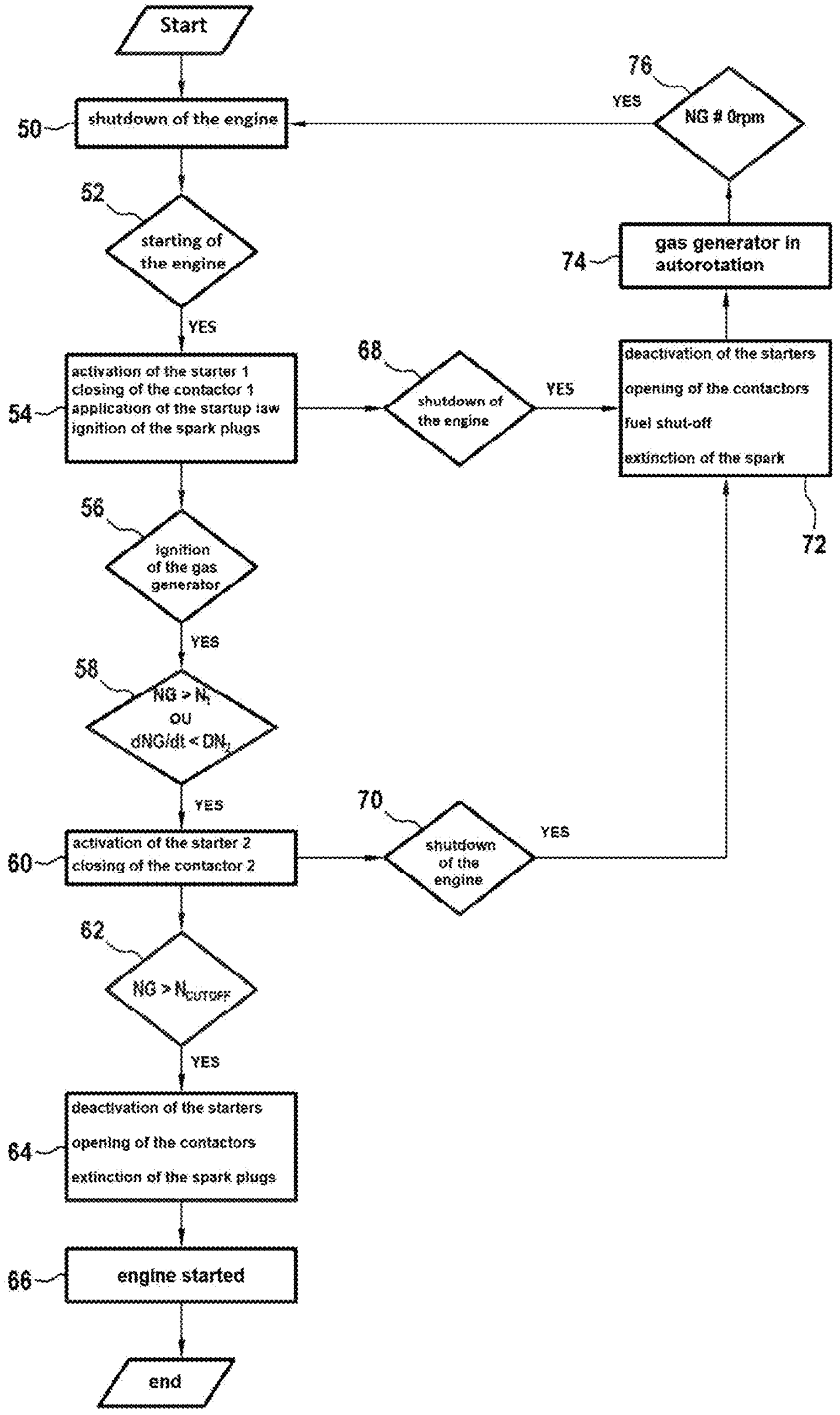

[Fig. 6]
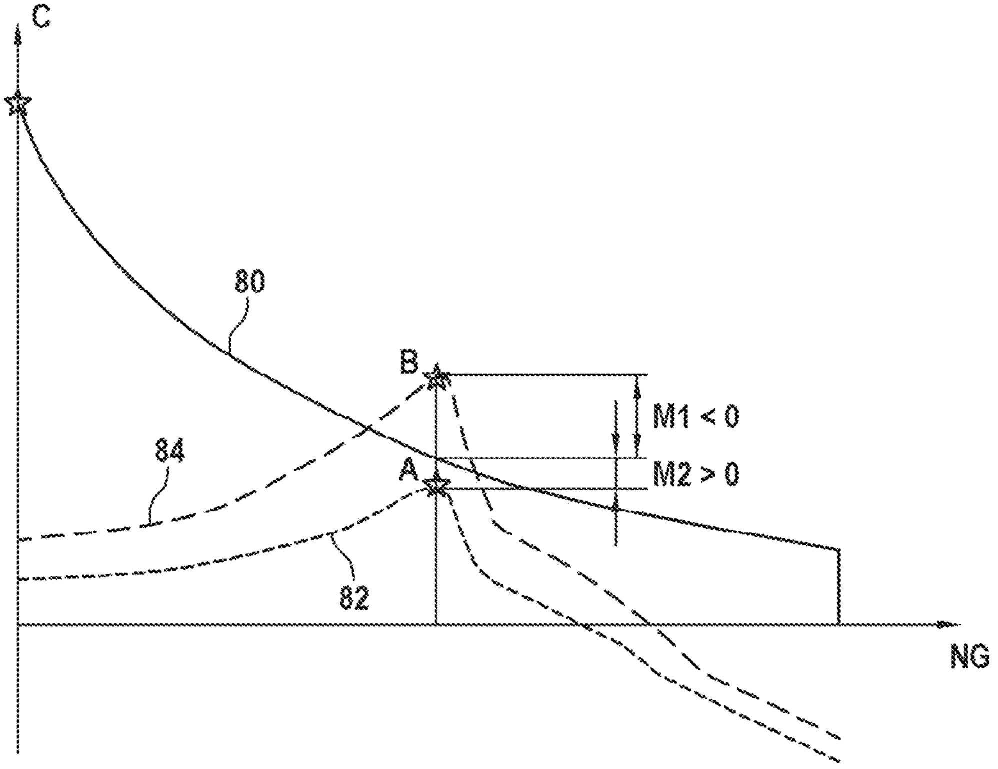

METHOD AND SYSTEM FOR STARTING AN AERONAUTICAL TURBINE ENGINE HAVING A FREE TURBINE AND A SINGLE-SPOOL GAS GENERATOR

CROSS-REFERENCE TO RELATED APPLICATIONS

This is a National Stage Application under 35 U.S.C. § 371 of International Application No. PCT/FR2024/050196, filed Feb. 14, 2024 now published as WO 2024/170855 A1, which claims priority to French Patent Application No. 2301371, filed on Feb. 14, 2023, the entireties of which are incorporated herein by reference.

TECHNICAL FIELD

The present invention relates to the field of the control of the startup of the aircraft turbomachines and more particularly concerns a method and a system for starting an aeronautical free turbine and single-spool gas generator turbomachine.

PRIOR ART

Climate change is a major concern for many legislative and regulatory bodies around the world. Indeed, various carbon emission constraints have been, are being, or will be adopted by various states. Particularly, an ambitious standard applies at the same time to the new types of aircrafts and to those currently in operation, requiring the implementation of the technological solutions in order to make them compliant with current regulations. Civil aviation has been mobilizing for several years now to contribute to the fight against climate change.

Technological research efforts have already led to very significant improvements in the environmental performance of the aircrafts. The Applicant takes into account the impacting factors in all phases of design and development to obtain less energy-intensive and environmentally friendly aeronautical components and products whose integration and use in civil aviation have moderate environmental impacts, with the aim of improving the energy efficiency of these aircrafts.

Consequently, the Applicant is constantly working to reduce the climate impact through the use of virtuous development and manufacturing methods and processes that minimize the greenhouse gas emissions to the minimum possible in order to reduce the environmental footprint of the activity.

These ongoing research and development works focus on the new generations of aircraft turbomachines, the aircraft weight reduction, in particular through the materials used and the lighter onboard equipment, the development of the use of the electric technologies ensuring the propulsion and, as an essential complement to the technological progress, the aviation biofuels.

It is known that medium-powered turbomachines (typically comprised between 1,500 and 4,500 kW on the engine shaft) are complex to start because their gas generator has a large drag torque, due in particular to significant mechanical friction and to high compressor pressure ratio, air flow rate and power take-off due to the accessories driven by the gas generator (oil and fuel pumps in particular). The startup of these turbomachines therefore generally requires either a pneumatic starter or a high-powered high-voltage electric starter (for example powered with 115V AC/400 Hz). In both cases, the use of an auxiliary power generator (APU for Auxiliary Power Unit) as a source of pneumatic or electric power, on board the aircraft and previously started, is inevitable, which considerably complicates the architecture of the aircraft systems, therefore the overall mass and costs (in particular the costs of acquiring and overhauling the APU).

To avoid the use of an APU to start such a medium-powered turbomachine, it is known to resort to a gas generator called two-spool gas generator, consisting of two distinct coaxial compressor-turbine shafts and of the bearing housings supporting these shafts, usually referred to as HP (High-Pressure) spool and LP (Low-Pressure) spool respectively. The starting torque required to start such a turbomachine is then equivalent to that of a low-powered single-spool turbomachine, since the starter only has to drive the HP spool of the gas generator.

Thus, and as shown in FIG. 6, provided that it is powered by a battery of sufficient capacity, a 28V brushed starter-generator with a power of 12 kW/400 A nominal in generation is capable of providing a starting torque 80 sufficient to compensate for the moderate drag torque 82 of the HP spool characteristic of a two-spool architecture, in particular at the critical speed (point A) where this drag torque is maximum (positive acceleration margin M2). On the other hand, during the startup of an equivalent single-spool turbomachine, the larger drag torque 84 specific to this architecture may exceed the starting torque that such a 12 kW/400 Astarter-generator can provide, in particular under detrimental ambient conditions (such as very low air, fuel and oil temperatures that maximize the resisting torques of the compressor and pumps), resulting in a negative acceleration margin M1 at the point of maximum drag torque (point B) and therefore the impossibility of starting the turbomachine in its entire desired startup range.

Furthermore, all things being equal, a two-spool turbomachine is significantly more complex from a mechanical point of view, more bulky, heavier, and more expensive than a single-spool turbomachine of equivalent performance, in particular due to the two coaxial shafts that constitute its gas generator.

Thus, there is a need for a simpler starting system than the existing ones, that is to say not requiring the addition of an APU or a two-spool architecture, and which therefore requires, in particular within the framework of re-engining, the least possible modification to an existing single-spool architecture of a rotary-wing or fixed-wing aircraft and whose main low-voltage onboard electrical network is exclusively powered with 28V DC from a battery.

DISCLOSURE OF THE INVENTION

To this end, the invention is the result of technological research aimed at very significantly improving the aircraft performance and, in that sense, contributes to reducing the environmental impact of these aircrafts. To this end, the main purpose of the present invention is therefore a method and system for starting medium-powered aircraft turbomachines that overcome the aforementioned drawbacks.

This aim is achieved by a method for starting an aeronautical free turbine and single-spool gas generator turbomachine, characterized in that to ensure, under the control of a turbomachine regulation computer, the startup of the turbomachine solely from a battery delivering a nominal direct voltage of 28V, two electric machines attached to the same accessory gearbox mechanically linked to the gas generator of the turbomachine and mounted in parallel on the battery are actuated sequentially, the first electric machine being started under a starting torque allowing an increase in the speed of the gas generator with a determined minimum acceleration, and the second electric machine being started only after detection of the ignition of the combustion chamber of the gas generator and before reaching a critical speed corresponding to the maximum resisting torque of the gas generator, the sum of the starting torques developed by the two electric machines being sufficient to guarantee in all circumstances that the torque margin at the maximum drag point corresponding to the maximum resisting torque of the gas generator is positive.

Thus, with this simple structure with two 28V brushed electric machines available as standard off-the-shelf, the torque margin at the maximum drag point of the gas generator is guaranteed without resorting to an APU but with the only 28V DC battery powering the onboard electrical network of the aircraft.

Preferably, once the ignition of the gas generator combustion chamber is detected, to start the second electric machine before reaching the critical speed, it is further verified that the rotation speed of the gas generator NG is greater than a predetermined minimum speed N1 or that the acceleration of the gas generator is smaller than a predefined acceleration threshold DN2.

Advantageously, the predetermined minimum speed is defined so as to ensure moderate acceleration of the gas generator within a preferred combustion chamber ignition window, and the predefined acceleration threshold DN2 is calculated so as to avoid a phenomenon of stagnation of the gas generator in a speed area corresponding to the maximum drag torque.

Preferably, the turbomachine regulation computer stops the first and second electric machines when, the maximum drag point having been exceeded, the speed of the gas generator of the turbomachine has reached a threshold from which the gas generator is capable of accelerating on its own to idle speed.

The invention also concerns a system for starting an aeronautical free turbine and single-spool gas generator turbomachine, a turbomachine regulation computer controlling the startup of the turbomachine solely from a battery delivering a nominal direct voltage of 28V, characterized in that it comprises two electric machines attached to the same accessory gearbox mechanically linked to the gas generator of the turbomachine and mounted in parallel on the battery, the turbomachine regulation computer being configured to sequentially actuate the two electric machines, the first electric machine being started under a starting torque allowing an increase in the speed of the gas generator with a determined minimum acceleration, and the second electric machine being started only after detection of the ignition of the combustion chamber of the gas generator and before reaching a critical speed corresponding to the maximum resisting torque of the gas generator, the sum of the starting torques developed by the two electric machines being sufficient to guarantee in all circumstances that the torque margin at the maximum drag point corresponding to the maximum resisting torque of the gas generator is positive.

According to the embodiment envisaged, the first and second electric machines may be two identical 28V brushed starter-generators each equipped with their regulation gearbox (GCU for Generator Control Unit), or the first electric machine may be a 28V series starter and the second electric machine may be a 28V brushed starter-generator equipped with its regulation gearbox GCU.

Preferably, each of the two electric machines is respectively connected to the battery by an associated starting contactor.

The invention finally concerns a rotary-wing or fixed-wing aircraft turbomachine comprising a starting system as mentioned above and the aircraft incorporating it.

BRIEF DESCRIPTION OF THE DRAWINGS

Other characteristics and advantages of the present invention will emerge from the description given below, with reference to the appended drawings which illustrate one exemplary embodiment thereof without any limitation and in which:

FIG. 1 schematically illustrates a starting system in accordance with the invention applied to an aeronautical single-spool turbomachine, FIG. 2 shows a first variant of the electrical architecture of the starting system of FIG. 1, FIG. 3 shows a second variant of the electrical architecture of the starting system of FIG. 1, FIG. 4 shows the variation curves of the starting torque and of the drag torque as a function of the speed of the gas generator, FIG. 5 illustrates the different steps of the method for starting a single-spool turbomachine in accordance with the invention, and FIG. 6 shows the variation curves of the starting and drag torques as a function of the gas generator speed for a single-spool turbomachine and a two-spool turbomachine.

DESCRIPTION OF THE EMBODIMENTS

The invention consists in proposing a system for starting a medium-powered gas turbine (typically comprised between 1,500 kW and 4,500 kW on the engine shaft) based on two conventional (brushed) electric machines attached to the same accessory gearbox and powered with 28V DC, thus avoiding the use of an auxiliary power unit, expensive element and presenting significant installation constraints on an aircraft equipped with a medium-powered free turbine and single-spool gas generator propulsive turbomachine, helicopter turbine engine or aircraft turboprop engine and turbofan, which constitutes the ideal solution from a mass and cost point of view for engining a rotary-wing or fixed-wing aircraft, equipped exclusively with a 28V direct onboard network.

FIG. 1 illustrates one example of a single-spool architecture of an aeronautical medium-powered free turbine turbomachine equipped with its starting system. The turbomachine 10 conventionally includes a compressor 12, a combustion chamber 14, a high-pressure turbine 16 (the assembly forming the gas generator), and a free turbine 18 driving the main transmission shaft 20 of the turbomachine actuating the main thruster 22 (helicopter rotor or propeller for example) via a main mechanical reduction gear 24. An accessory gearbox 26, mechanically linked to the gas generator, drives in particular the oil pumps and the pumps associated with the fuel injectors of the combustion chamber, and also includes a reduction assembly connecting it to the starting system 28.

According to the invention, the starting system comprises two 28V DC brushed electric machines 30, 32 powered by a battery and which will be activated sequentially to ensure the startup of the aeronautical turbomachine. This battery, which can be a single battery or a battery set delivering the nominal direct voltage of 28V, also ensures the powering of the main onboard electrical network of the aircraft.

It should be noted for the remainder of the description that the voltage of 28V is a nominal operating value, the no-load voltage of a 28V battery typically being likely to vary between 18V and 26V depending on its state of charge and temperature, and the voltage actually applied to the terminals of the starter-generator being even lower due to voltage drops in the cables and the contactors.

More specifically, it is planned to begin the startup with a single electric machine, under a torque for ensuring a moderate increase in the speed of the gas generator for optimizing the probability of ignition of the combustion chamber, the second electric machine being started only after detection of the ignition of the gas generator and before reaching a critical speed corresponding to the maximum resisting torque of the gas generator, the sum of the starting torques developed by the two electric machines being sufficient to guarantee in all circumstances that the torque margin at the critical point (that is to say the maximum resisting torque corresponding to the point of maximum drag of the gas generator) is positive.

FIGS. 2 and 3 show two possible exemplary embodiments for the electrical architecture of the starting system according to the invention in which, depending on the embodiment envisaged, the two 28V DC brushed electric machines attached to the accessory gearbox 26 are respectively two identical starter-generators, or one starter-generator and one simple series starter (electric machine with series excitation).

Each electric machine 30, 32; 30, 34 is equipped with its own starting contactor 30A, 32A, 34A which ensures its connection with a common 28V DC starting battery 36. Of course, if a battery common to the two electric machines has been represented, it is also possible to envisage that each electric machine is powered by a distinct battery, or that the battery is made up of two different batteries with the same nominal voltages connected in parallel during startup. The brushed starter-generators are each equipped with an electronic regulation gearbox 30B, 32B (GCU for Generator Control Unit), while the simple series starter is not (so that it cannot operate as a generator).

In FIG. 2, the two electric machines 30, 32, which are two identical starter-generators, therefore have two power take-offs with the same reduction ratio. However, in FIG. 3, since the two electric machines are different, the power take-off of the series starter 34 will therefore have a different reduction ratio than that of the starter-generator 30, since once the series starter is cut off, it disengages from the gas generator and therefore does not need to be sized for the mechanical stresses linked to the nominal operating speed NG of the gas generator.

Indeed, the power take-off (or PTO corresponding to the transmission shaft) of the series starter on the accessory gearbox 26 is generally equipped with a freewheel, in order to mechanically disengage the rotor of the electric machine from the accessory gearbox when the series starter is cut off. This allows optimizing the maximum speed and therefore the sizing of this series starter, which does not have to withstand the driving by the gas generator at its nominal operating speed, but only the cut-off speed of the series starter which is generally of the order of 50 to 60% of the nominal rotation speed NG of the gas generator shaft of the turbomachine. Due to the presence of this freewheel, it is preferable for the series starter to be energized first, and the starter-generator to be energized second. Indeed, if the series starter is energized second while the gas generator is already rotating under the effect of the driving by the starter-generator, its rotor, initially stationary because it is decoupled from the accessory gearbox by the freewheel, will accelerate extremely quickly (because it runs idle) until the freewheel suddenly resynchronizes with the accessory gearbox, which could damage it.

FIG. 4 illustrates the variation curves of the starting torque 40 of the starting system and of the resisting or drag torque 42 of the gas generator as a function of the rotation speed NG of the main shaft of the turbomachine. In a first part (I) of these curves 40, 42, only one electric machine is energized by closing its associated starting contactor. Given the resisting torque and the high inertia of the single-spool gas generator, the speed increase is relatively slow, which is favorable to the ignition of the combustion chamber of the turbomachine. On the other hand, the initial torque at energization under zero speed (point A) is not higher than for a standard two-spool configuration, which avoids mechanically oversizing the accessory gearbox. Then, when in a second part (II) of the curve 42, the drag torque begins to increase sharply and when the starting torque of the first electric machine risks being insufficient to continue accelerating the gas generator, the second electric machine is energized by closing its associated starting contactor, so as to provide the additional torque necessary to ensure a positive acceleration margin M at the maximum drag point, located around 30 to 40% of NG (point B). A third part (III) then begins, where the starting and drag torques decrease and if the startup of the turbomachine is successful, the two electric machines are cut off simultaneously around 50 to 60% of NG, the gas generator continuing to accelerate under its own power under the control of the turbomachine regulation computer (EECU), until reaching its nominal idle speed.

A control flowchart for the electric machines is illustrated in FIG. 5. The turbomachine being initially stopped in a first step 50, an order to start the turbomachine is given by the pilot in a step 52 so that the turbomachine regulation computer (EECU) simultaneously orders in a following step 54 the energization of the starter No. 1 (via the closing of the associated contactor), the injection of fuel according to an appropriate startup law and the energization of the spark plugs. As the gas generator increases in speed, air is admitted into the combustion chamber, the sparks from the spark plugs ignite the air-fuel mixture and the combustion chamber ignites. When the ignition of the chamber has been detected by the EECU in a new step 56, which is usually done by noting the increase in the temperature of the combustion gases at the turbine inlet (TIT for Turbine Inlet Temperature), it is verified in a step 58 whether the speed NG of the turbomachine is greater than a predetermined speed N1. This threshold N1 is a compromise between, on the one hand, a sufficiently low value that allows, under the most detrimental conditions (engine and oil impregnated at very low temperature, maximum air density, lowest starter supply voltage), ensuring that the energization of the starter No. 2 will allow the combined starter torque of the two electric machines to cross the point of maximum drag torque of the gas generator, and on the other hand, a sufficiently high value allowing to remain as long as possible in the ideal ignition window of the combustion chamber with the only energized starter No. 1, so as to minimize the acceleration of the gas generator in this speed range and thus optimize the ignition conditions. An alternative condition may consist, in this step 58, in directly verifying whether the acceleration of the gas generator dNG/dt becomes smaller than an acceleration threshold DN2, meaning that the margin between the engine torque provided by the starter No. 1 on the one hand and the resisting torque of the gas generator when approaching the point B on the other hand, becomes insufficient to continue accelerating the gas generator (a phenomenon known as phenomenon of stagnation, potentially damaging to the turbomachine).

When at least either of these two conditions is met, the energization of the starter No. 2 is then ordered in a subsequent step 60 by closing the associated contactor. The added torque of the two starters allows maintaining a positive acceleration margin when the gas generator drag torque is at its highest. When in a new step 62, the speed NG of the turbomachine reaches the end-of-start speed NCUT-OFF, generally of the order of 50 to 60% of NG, that is to say the one where the turbomachine, under the effect of the expansion of the combustion gases in the turbine of the gas generator, is capable of accelerating on its own to idle speed, the EECU, in a step 64, turns off the spark plugs, opens the contactors and thus deactivates the two starters, the turbomachine then being considered as started in the final step 66. Once the idle speed is reached, the starter-generator(s) can be switched to electrical generation mode and supply the 28V DC onboard electrical network of the aircraft, making it possible in particular to recharge the battery used to provide the two electric machines with the energy necessary for the startup.

It will be noted that at any time (steps 68 or 70), the pilot can issue an order to shutdown the turbomachine, initiating a new step 72 in which the EECU cuts off the fuel injection, turns off the spark plugs, opens the contactors and thus deactivates the two starters, the gas generator finding itself in an autorotation rpm in the following step 74 before the turbomachine returns to its initial shutdown position of step 50 when the speed NG becomes zero.

The invention thus offers numerous advantages over a starting system requiring an APU or a two-spool architecture:

- It requires only standard off-the-shelf hardware (28V DC brushed generators, series starter, high-current contactors),
- It is fully compatible with a 28V DC onboard electrical network (on the condition of having one or several starting batteries of sufficient capacity),
- It avoids oversizing the accessory gearbox for the torque that both starters would provide during the closing of the starter contactor if they were energized simultaneously,
- It allows starting a medium-powered turbomachine with a single-spool gas generator and high drag torque, by limiting the torque within the combustion chamber ignition window,
- In the two-generators-starters variant, it provides redundancy of the 28V DC electrical generation, and
- The associated software modifications for managing the startup sequence are simple and therefore technically low-risk in terms of development.

The invention claimed is:

1. A method for starting an aeronautical free turbine and a single-spool gas generator turbomachine, wherein to ensure, under the control of a turbomachine regulation computer, the startup of the turbomachine solely from a battery delivering a nominal direct voltage of 28V, two electric machines attached to a same accessory gearbox mechanically linked to a gas generator of the turbomachine and mounted in parallel on the battery are actuated sequentially, the first electric machine being started under a starting torque allowing an increase in a speed of the gas generator with a determined minimum acceleration, and the second electric machine being started only after detection of the ignition of the combustion chamber of the gas generator and before reaching a critical speed corresponding to a maximum resisting torque of the gas generator, a sum of starting torques developed by the two electric machines being sufficient to guarantee in all circumstances that a torque margin at a maximum drag point corresponding to the maximum resisting torque of the gas generator is positive.

2. The starting method according to claim 1, wherein, once the ignition of the gas generator combustion chamber is detected, to start the second electric machine before reaching the critical speed, it is further verified that a rotation speed of the gas generator is greater than a predetermined minimum speed N1 or that the acceleration of the gas generator is smaller than a predefined acceleration threshold DN2.

3. The starting method according to claim 2, wherein the predetermined minimum speed N1 is defined so as to ensure moderate acceleration of the gas generator in a preferred combustion chamber ignition window, and the predefined acceleration threshold DN2 is calculated so as to avoid a phenomenon of stagnation of the gas generator in a speed area corresponding to the maximum drag torque.

4. The starting method according to claim 1, wherein the turbomachine regulation computer stops the first and second electric machines when, the maximum drag point having been exceeded, the speed of the gas generator of the turbomachine has reached a threshold from which the gas generator is capable of accelerating on its own to idle speed.

5. A system for starting an aeronautical free turbine and a single-spool gas generator turbomachine, a turbomachine regulation computer controlling the startup of the turbomachine solely from a battery delivering a nominal direct voltage of 28V, wherein it comprises two electric machines attached to a same accessory gearbox mechanically linked to the gas generator of the turbomachine and mounted in parallel on the battery, the turbomachine regulation computer being configured to sequentially actuate the two electric machines, the first electric machine being started under a starting torque allowing an increase in a speed of the gas generator with a determined minimum acceleration, and the second electric machine being started only after detection of the ignition of the combustion chamber of the gas generator and before reaching a critical speed corresponding to a maximum resisting torque of the gas generator, a sum of starting torques developed by the two electric machines being sufficient to guarantee in all circumstances that a torque margin at a maximum drag point corresponding to the maximum resisting torque of the gas generator is positive.

6. The starting system according to claim 5, wherein the first and second electric machines are two identical 28V brushed starter-generators each equipped with their regulation gearbox.

7. The starting system according to claim 5, wherein the first electric machine is a 28V series starter and the second electric machine is a 28V brushed starter-generator equipped with its regulation gearbox.

8. The starting system according to claim 5, wherein each of the two electric machines is respectively connected to the battery by an associated starting contactor.

9. A rotary-wing or fixed-wing aircraft turbomachine comprising a starting system according to claim 5.

10. A rotary-wing or fixed-wing aircraft comprising at least one turbomachine according to claim 9.

* * * * *